United States Patent [19]

Frantz

[11] 4,261,715
[45] Apr. 14, 1981

[54] DESICCANT CANISTER ASSEMBLY
[75] Inventor: Virgil L. Frantz, Salem, Va.
[73] Assignee: Graham-White Sales Corporation, Salem, Va.
[21] Appl. No.: 18,061
[22] Filed: Mar. 6, 1979
[51] Int. Cl.³ .............................................. B01D 53/00
[52] U.S. Cl. ........................................ 55/387; 55/475; 55/316; 55/DIG. 17
[58] Field of Search ................ 55/162, 163, 387, 389, 55/DIG. 17, 208, 179, 33, 62, 75, 475

[56] References Cited
U.S. PATENT DOCUMENTS

| | | | |
|---|---|---|---|
| 3,338,032 | 8/1967 | Siewert | 55/162 |
| 3,464,186 | 9/1969 | Hankison et al. | 55/163 |
| 3,628,314 | 12/1971 | McCarthy | 55/387 |
| 4,029,486 | 6/1977 | Frantz | 55/389 |
| 4,052,178 | 10/1977 | Frantz | 55/DIG. 17 |
| 4,108,617 | 8/1978 | Frantz | 55/162 |
| 4,113,451 | 9/1978 | Frantz | 55/162 |

Primary Examiner—Charles N. Hart
Assistant Examiner—E. Rollins Cross
Attorney, Agent, or Firm—Wilmer Mechlin

[57] ABSTRACT

A canister assembly for containing a particulate desiccant in a housing of a compressed gas filter assembly having for the feed end of a canister a resiliently compressible closure formed of normally spring-spaced inner and outer parts connected for limited relative axial movement, the closure in operative position being contained and releasably locked in the canister with its inner part yieldably engaging an adjoining end of a charge of particulate desiccant.

6 Claims, 2 Drawing Figures

DESICCANT CANISTER ASSEMBLY

BACKGROUND OF THE INVENTION

While particulate desiccants such as molecular sieves are widely used in compressed gas filter assemblies for selectively adsorbing a contaminant, such as moisture, entrained in the gas, if the desiccant is not tightly compacted in the canister or other container in which it is contained, the inter-abrasion of the desiccant particles produces an abrasive dust which is carried off by the filtered product gas to the detriment of air brakes or other devices operated by the product gas. Fluid-actuated top or bottom-acting compactors, such as disclosed in the filter assemblies of Lanier Frantz U.S. Pat. No. 4,029,086 and my U.S. Pat. No. 4,113,451, by exerting a compacting force on the desiccant, minimize dust formation by the desiccant particles. Also, as opposed to the external compacting springs they are designed to replace, the fluid-actuated compactors of the Frantz patents not only automatically apply a substantially uniform force over their compacting range but can readily release that force to facilitate insertion and removal of the canister.

Necessarily limited in their automatic compacting action to a particulate desiccant in a canister installed in a filter assembly, the disclosed embodiments of the compactors of the Frantz patents cannot compensate for any looseness of the desiccant charge before the canister is installed and, given such looseness, the handling of a charged canister before installation, particularly in the field, can cause the desiccant particles to create dust. If, as in those patents, the canister closure is rigid, avoidance of the initial looseness requires that the canister be very carefully loaded to capacity and this in turn renders it difficult to apply the closure. It is to a solution of these problems that the present invention is particularly directed.

SUMMARY OF THE INVENTION

The primary object of the present invention is to provide an improved desiccant canister assembly wherein a closure for a feed end of a canister of the assembly is so constructed as to be readily applied to the canister and, when applied, to compact the desiccant particles despite variations over a predetermined range in the quantity of the charge.

Another object of the invention is to provide for a compressed gas filter assembly an improved desiccant canister assembly wherein a charge of particulate desiccant is contained in a canister and the feed end of the canister is closable by a resiliently compressible closure adapted by compensating for variations in the desiccant charge to facilitate application of the closure after the canister is loaded and, when applied, to compact the desiccant.

A further object of the invention is to provide for a compressed gas filter assembly having a pneumatic compactor for compacting a particulate desiccant contained in a canister, an improved canister assembly whereof the feed end of the canister is closable by a resiliently compressible closure readily applied to a loaded canister and adapted not only to compact the desiccant despite variations in the quantity of the charge but to yield to the force applied by and transfer compacting to the pneumatic compactor on activation thereof while maintaining a compacting force on the desiccant in case of accidental deactivation of the compactor.

An additional object of the invention is to provide an improved desiccant canister assembly for containing in a canister a charge of particulate desiccant, wherein a resiliently compressible closure removably insertible into a feed end of the canister for applying internally of the canister and against the desiccant a spring force for compacting the desiccant, is fully compressible by an externally applied superior force for transferring compaction of the desiccant thereto.

Other objects and advantages of the invention will appear hereinafter in the detailed description, be particularly pointed out in the appended claims and be illustrated in the accompanying drawings, in which:

FIGURE DESCRIPTION

FIG. 1 is a central vertical sectional view of a preferred embodiment of the desiccant canister assembly of the present invention; and FIG. 2 is a horizontal sectional view taken along lines 2—2 of FIG. 1.

DETAILED DESCRIPTION

Figure 1:
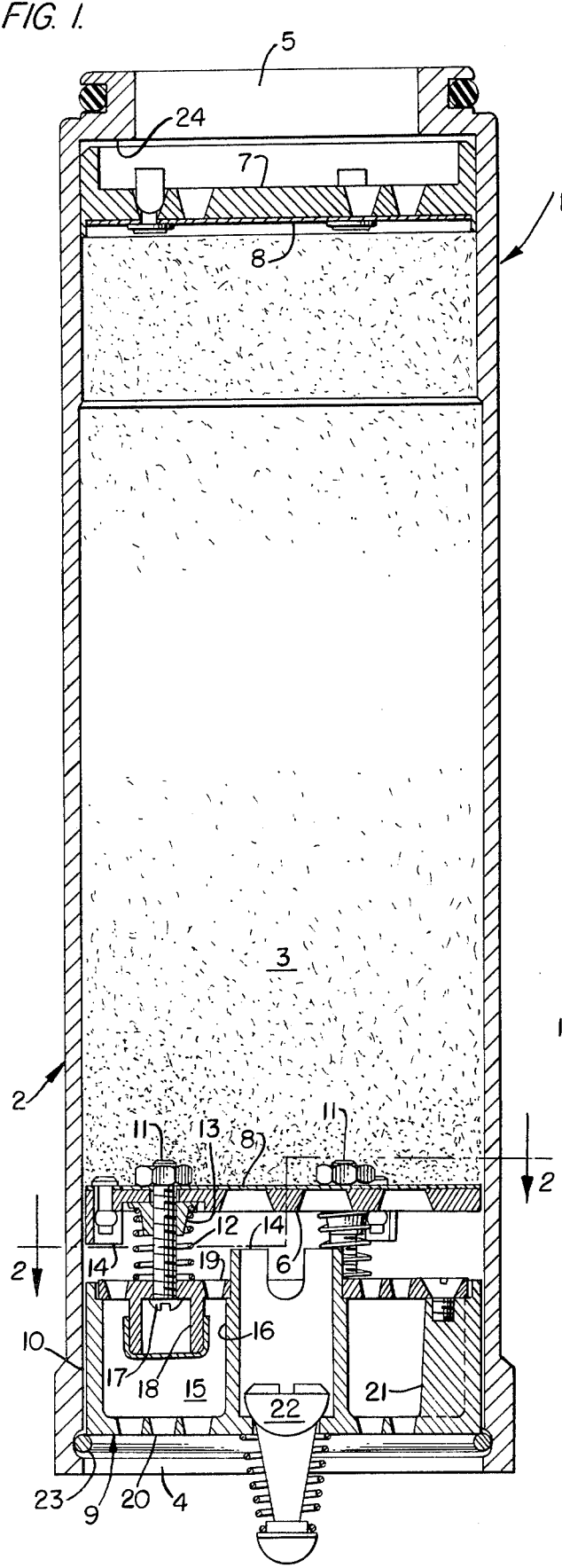
Figure 2:
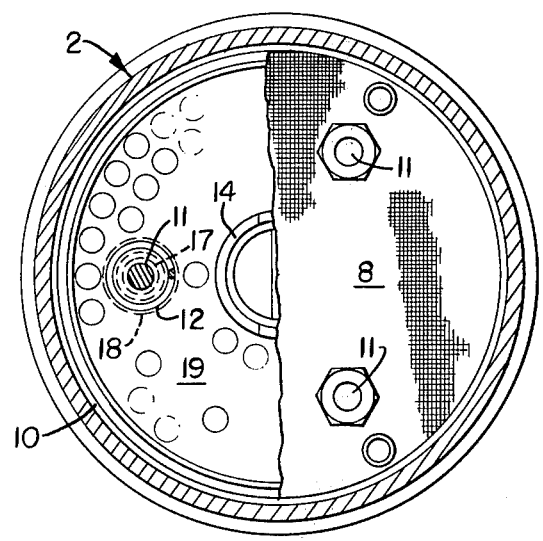

Referring now in detail to the drawings in which like reference characters designate like parts, the improved desiccant canister assembly of the present invention is designed for resiliently or yieldably compacting a particulate desiccant in a canister to compensate for variations in the loading and facilitate closing of the feed end of the canister by a closure responsible for the compacting. While adaptable for use on other particulate materials and in other desiccant-type compressed gas filter assemblies, the improved canister assembly is particularly adapted for use in filter assemblies such as disclosed in Lanier Frantz U.S. Pat. No. 4,029,086 and my U.S. Pat. No. 4,113,451, in which a particulate desiccant in a canister is compacted during operation of the filter assembly by a fluid-actuated compactor, and will be so described as exemplary of the invention.

With the drawings showing only a preferred embodiment of the improved canister assembly of the present invention, the disclosures of the above Frantz patents are relied on and incorporated by reference herein for their showing of compressed gas filter assemblies typifying those in which the improved canister assembly is particularly adapted to be used.

The improved desiccant canister assembly, designated as 1, is comprised of a suitably cylindrical canister or container 2 adapted to contain or be charged with a load or charge of a particulate desiccant 3, such as a molecular sieve, adapted to selectively adsorb an entrained contaminant, such as moisture, from compressed gas passing therethrough.

As in the compressed gas filter assemblies of the cited Frantz patents, the canister 2 is removably insertible or seatable, conveniently upright or vertically disposed, in a housing of a filter unit of the filter assembly, in the path of flow of compressed gas therethrough. Itself open-ended, the canister 2 contains the desiccant charge 3 vertically, axially or at opposite ends between the canister's inlet, feed, loading, lower or upstream end 4 and a preferably relatively restricted outlet, upper or downstream end 5 by perforated or foraminous upper or downstream and lower or upstream end plates 6 and 7, respectively. Preferably both slidable vertically or axially in and insertible from the bottom into the canister 2 through the latter's wider feed end 4, the end plates 6 and 7, for preventing escape of desiccant particles through their perforations, desirably have fixed, as by riveting, to their desiccant-confronting faces, fine mesh screens 8.

In the canister assembly 1, the lower end plate 6 is the upper or inner part or spring-loaded compression plate of a yieldably or resiliently compressible closure 9, as a whole slidable vertically or axially in and insertible into the lower end of the canister 2 through the latter's feed end 4 for closing that end after the canister in inverted position has been loaded with a charge of the selected particulate desiccant 3. The closure 9 has a lower or outer part 10 of the illustrated basket or other suitable shape, but, whatever its shape, that part and the upper or inner part, in the form of the lower end plate 6, are connected as a subassembly for limited vertical or axial movement, as by plurality, usually three or four, of circumferentially spaced bolts 11 and normally spaced by a plurality of compression springs 12, each loosely encircling one of the bolts 11 and centered thereon by a grommet 13 on the bolt and seating against and depending from the upper part 6. Limited in expansion or relative outward movement or travel by the connecting bolts 11, the inner and outer parts 6 and 10 of the closure 9, for protecting the springs 12 from going solid, are limited in compression or relative inward movement or travel by abutments or stops 14 on and suitably integral with one or each of the parts and instanding toward and engageable with a confronting surface on the other part.

In the illustrated embodiment, the basket or cup-shaped lower part 10 of the closure 9 is adapted to house or contain in a compartment 15 about an upstanding tubular central boss 16 a scrubber (not shown), such as the annular pad of stainless steel wool shown in my U.S. Pat. No. 4,113,451, for entrapping or collecting and thus protecting the bed from progressive clogging by fine oil particles entrained in the compressed gas being filtered. In turn, the scrubber is protected from being mashed or otherwise distorted by the bolts 11 on compression and expansion of the closure 9 by isolating or containing the head 17 of each bolt over the limits of its travel in a plastic or like-capped well or socket 18 projecting downwardly into the compartment 15 and formed on and depending from a removable cover plate 19 closing the inner or upper end of the compartment.

With the compartment 15 in the illustrated basket-shaped lower part 10 contained vertically between the cover plate 19 and the base 20 of that part and both the base and cover plate perforated or foraminous over their otherwise free or uninterrupted areas to pass compressed gas being filtered through that part and thence through the compression plate 6 to the desiccant bed 3, the lower part supports the cover plate centrally on the central boss 16 and at sides on a plurality of vertical ribs or abutments 21 rigid or integral therewith and each instanding radially from a side thereof between an adjoining pair of the sockets 18. With the cover plate 19 conveniently screwed to the ribs 21, the lower part 10 centrally carries or mounts a check valve 22 for bypassing the compressed gas through the central boss 16 in case the scrubber pad becomes clogged by entrapped oil. After insertion into the canister 2, the closure 9 is removably held in place and backed, suitably by a snap ring 23, inserted into and seating in the feed end 4 of the canister below or upstream of the closure. If, as illustrated, slidable axially or longitudinally in the canister 2, the upper end plate 7 in turn is backed by an annular shoulder 24 instanding thereabove or beyond and bounding or demarking the canister's outlet end 5.

Constructed in the above manner, the canister 2, inverted and with the upper end plate 7 in place, is loaded through its feed end 4 with a charge of a small bead molecular sieve or other selected particulate desiccant 3 to a point where, when the closure 9 is thereafter inserted into the feed end, the lower or upstream end of the desiccant bed will be yieldably engaged by the closure's compression plate 6. By holding the combined force of the compression springs 12 within a relatively low range, which for the illustrated three-spring arrangement suitably will be around 15 lbs. (6.75 kgs.) and the preferred compression range or travel of the closure on the order of about ¼ in. (0.635 cm.), the closure is not only readily insertible into the feed end of the canister after the latter is loaded and avoids the otherwise necessary preciseness in loading, but, since partly compressed, provides a spring force for compacting the desiccant 3 in the interval between the loading of the canister and its insertion or installation in a housing of a filter unit of a compressed gas filter assembly, such as shown in either of the previously mentioned Frantz patents.

As illustrated, the canister assembly 1 is particularly designed for use in the filter unit of L. Frantz U.S. Pat. No. 4,029,086, in which, during operation of the filter assembly, the desiccant 3 is compacted by a top acting pneumatic compactor acting downwardly against the upper end plate 7, the external force exertible on the canister assembly by the compactor, once activated, usually being on the order of about 120 lbs. (54 kgs.) in truck and bus installations of the filter assembly of the L. Frantz patent. The effect of such activation is to fully compress the closure 9 under the superior force of the compactor and inactivate its compression springs 12. However, even though so inactivated, the springs 12 nonetheless are available for compacting the desiccant 3 should the compactor be accidentally deactivated or discharged.

When applied to the filter assembly of the above L. Frantz patent with its top acting compactor, the upper end plate 7 serves as a floating follower and, backed by the snap ring 23, the closure's lower part 10 remains stationary and only its upper part or compression plate 6 moves and then only to the point of full compression. However, if, as in the filter assembly of my U.S. Pat. No. 4,113,451, the pneumatic compactor is bottom acting, the closure 9 must serve as the floating follower and the upper end plate 7 the stationary reactant. To adapt it for such use with a bottom acting compactor, the illustrated canister assembly 1 requires modification but the modification is slight, involving only the mounting of the check valve 22 inside the central boss 16, in the manner of the check valve of my patent, for enabling the compactor to act against the base 20 of the closure 9. With this modification, and the closure 9 the floating follower, the effect of activation of the bottom acting compactor initially is, by its superior force relative to that of the springs 12, to fully compress the closure and thereafter apply the full force of the compactor in compacting the desiccant.

From the above detailed description it will be apparent that there has been provided an improved canister assembly having a canister loadable with a charge of a desiccant or other particulate material, which, when loaded, has its feed end closed by a resiliently compressible closure adapted not only to be readily applied and, when applied, exert a compacting force on the desiccant but also in the presence of a superior external compacting force, to be fully compressed for yielding or transferring compaction of the particulate desiccant or other material to the superior force. It should be understood that the described and disclosed embodiment is merely exemplary of the invention and that all modifications are intended to be included that do not depart from the spirit of the invention and the scope of the appended claims.

Having now described my invention, I claim:

1. A canister assembly for containing particulate material, comprising a canister loadable through a feed end thereof with a charge of said material, and closure means releasably insertible as a whole into said feed end after loading of said canister for engaging and containing an adjoining end of said charge, said closure means including a spring loaded compression plate sub-assembly with limited vertical or axial movement, comprising an end plate inner part and an outer part slidable vertically or axially in and insertable through the feed end of said canister, and spring means normally spacing said parts and resiliently compressible for applying a compacting force to and accommodating variations in said charge.

2. A canister assembly according to claim 1, wherein said particulate material is a particulate desiccant for selectively adsorbing in a compressed gas filter assembly a contaminant from compressed gas passed therethrough, the charge of said desiccant on loading into the canister is contained therein between said feed end and an outlet end thereof, and including foraminous means in said outlet end for containing and passing filtered gas from an outlet end of said charge, the closure means also being foraminous for passing compressed gas from the feed end through the charge.

3. A filter assembly according to claim 2, wherein the outlet end foraminous means and closure means are slidable longitudinally in and limited in outward movement relative to the canister, and the closure means is fully compressible by a superior force applied thereto through the desiccant for transferring compaction of the desiccant to said superior force.

4. A canister assembly according to claim 3, including means insertible into the feed end of the canister outwardly of said outer part for releasably locking the closure means in the canister.

5. A canister assembly according to claim 4, wherein the outer part of the closure means is compartmented for housing scrubber means for trapping oil from compressed gas passing therethrough.

6. A canister assembly according to claim 4, including means connecting the inner and outer parts for limiting relative outward travel thereof, and stop means on at least one of the parts and engageable with the other part for limiting relative inward travel thereof.

* * * * *